(12) United States Patent
Barnes et al.

(10) Patent No.: US 6,850,835 B1
(45) Date of Patent: Feb. 1, 2005

(54) ON ENGINE TRIM FOR FUEL INJECTORS

(75) Inventors: Travis Barnes, Metamora, IL (US);
Mike Lukich, Chillicothe, IL (US);
Scott Leman, Eureka, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/632,722

(22) Filed: Aug. 1, 2003

(51) Int. Cl.$^7$ ................................................. G06G 7/70
(52) U.S. Cl. ..................... 701/114; 701/103; 701/104; 701/110; 123/680; 123/299; 123/490; 123/357; 73/119 A
(58) Field of Search ................................. 701/103, 104, 701/110, 114; 123/299, 357, 490, 680, 681; 73/119 A

(56) References Cited

U.S. PATENT DOCUMENTS

| | | |
|---|---|---|
| 4,387,589 A | 6/1983 | Larson |
| 4,499,876 A | 2/1985 | Yamamoto |
| 4,557,140 A | 12/1985 | McFarland |
| 4,603,669 A * | 8/1986 | Takemoto et al. .......... 123/357 |
| 5,113,830 A | 5/1992 | Haines |
| 5,634,448 A | 6/1997 | Shinogle et al. |
| 5,868,116 A | 2/1999 | Betts et al. |
| 6,002,980 A | 12/1999 | Taylor et al. |
| 6,189,378 B1 | 2/2001 | Kendrick et al. |
| 6,363,314 B1 * | 3/2002 | Hafner et al. ............... 701/104 |
| RE37,807 E | 7/2002 | Shinogle et al. |
| 6,480,781 B1 | 11/2002 | Hafner et al. |
| 6,510,731 B2 | 1/2003 | Schricker et al. |
| 6,520,158 B1 | 2/2003 | Mills |
| 6,561,164 B1 * | 5/2003 | Mollin ........................ 123/446 |
| 6,588,398 B1 * | 7/2003 | Rodier ........................ 123/299 |

* cited by examiner

*Primary Examiner*—Willis R. Wolfe
*Assistant Examiner*—Johnny H. Hoang
(74) *Attorney, Agent, or Firm*—Steve D Lundquist; Michael L Woods

(57) ABSTRACT

A method and apparatus for trimming a fuel injector located on an engine. The method and apparatus includes modifying an engine speed control, interrupting at least one injection event, monitoring a change associated with an engine speed, and responsively trimming the injector.

20 Claims, 4 Drawing Sheets

Fig-2-

Fig_3_

ON ENGINE TRIM FOR FUEL INJECTORS

TECHNICAL FIELD

This invention relates generally to a method and apparatus for trimming fuel injectors in an engine and, more particularly, to a method and apparatus for trimming fuel injectors based on changes in engine speed during cutout of injection events.

BACKGROUND

Due to variations in individual fuel injectors and the need for consistent performance among all injectors used in an engine, various techniques have been employed in attempts to match performance characteristics of injectors for use as a set in an engine. For example, manufacturing processes must observe strict tolerances to help achieve uniformity of injector specifications. In spite of this, performance differences still exist, which may be addressed by electronic trimming (e-trim) of the injectors on a test bench, and subsequent matching of injector sets for use in an engine.

The above techniques, however, can only be effective to a certain extent. Since manufacturing strategies and test bench e-trim processes are conducted under restricted conditions, the reality of use in an engine under a wide variety of operating conditions reveals shortcomings of injector-to-injector performance that are not evident otherwise. In particular, injector performance during low idle conditions, i.e., when very small fuel quantities are being demanded of the injectors, may not be as optimal as performance under operating conditions which more closely resemble test bench conditions.

In addition, conditions related to the operation of the engine itself, such as changing temperature conditions (both with respect to time and location on the engine) and low pressure dynamics (particularly during low idle) contribute to variations in injector performance characteristics.

Attempts have been made in the past to trim injectors after installation on an engine. Typically, these methods involve cutting out operation of one injector at a time and monitoring changes in fuel delivery to the remaining injectors. The changes in fuel delivery are analyzed to determine trim requirements for each injector, typically in the form of varying injection duration. It has been found, however, that the changes in fuel delivery may not offer enough resolution for analysis, particularly during low idle conditions when the amount of fuel demanded is very small. The problem is compounded, moreover, when engine operations involves delivery of multiple shots of fuel, such as a split injection mode, thus making individual fuel deliveries much smaller.

An alternative to measuring changes in fuel delivery during cutout testing is to monitor changes in engine speed, a parameter that may offer more resolution for incremental changes. For example, in U.S. Pat. No. 5,113,830, Haines discloses a control system which, under certain operating conditions, monitors changes in engine speed as individual injectors are disabled. Haines, however, specifically limits this form of testing to operating conditions in which no speed governing takes place. Therefore, testing cannot be conducted, for example, at low idle speeds, during which the system of Haines is in a "two speed governing mode". Furthermore, Haines conducts testing by disabling injectors completely and does not perform tests in which only injector events, such as particular shots of multi-shot injections, are halted.

The present invention is directed to overcoming one or more of the problems as set forth above.

SUMMARY OF THE INVENTION

In one aspect of the present invention a method for trimming a fuel injector located on an engine is disclosed. The method includes the steps of modifying an engine speed control, interrupting at least one injection event, monitoring a change associated with an engine speed, and responsively trimming the injector.

In another aspect of the present invention an apparatus for trimming a fuel injector located on an engine is disclosed. The apparatus includes an engine speed control device, an engine speed sensor, and a controller for modifying an engine speed control of the engine speed control device, interrupting at least one injection event, monitoring a change in engine speed, and responsively trimming the injector.

DETAILED DESCRIPTION

Figure 1:
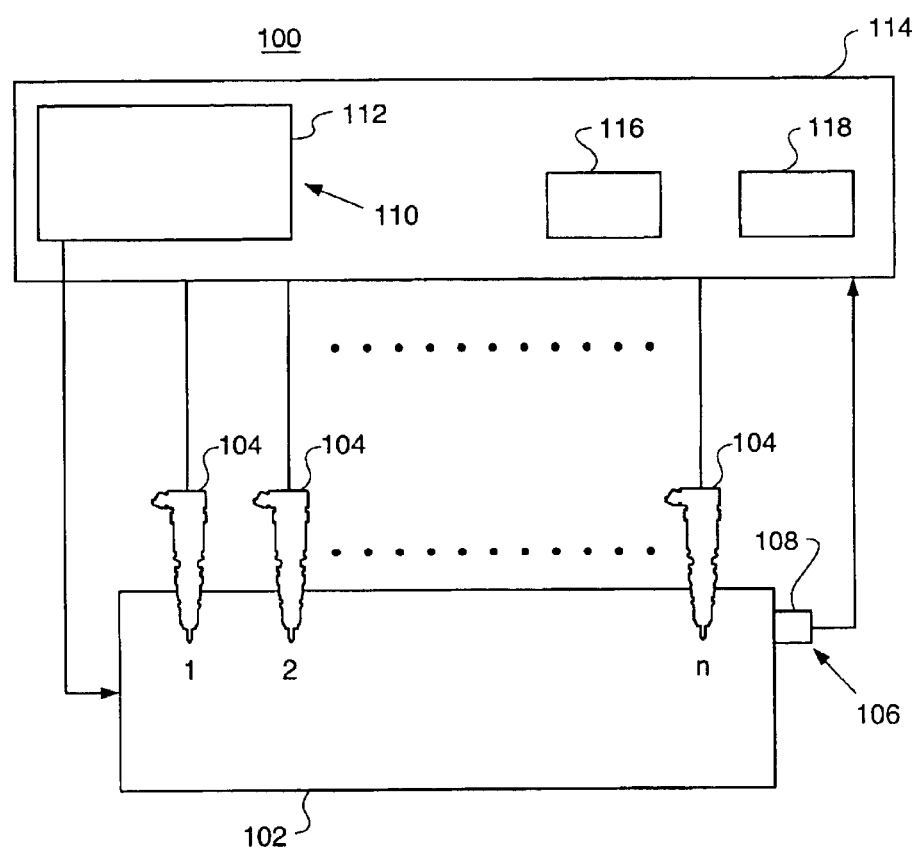
FIG. 1 is a block diagram illustrating a preferred embodiment of the present invention.

Referring to the drawings and the accompanying claims, a method and apparatus 100 for trimming a fuel injector 104 located on an engine 102 is disclosed.

Referring to FIG. 1 in particular, an engine 102 is shown, including a plurality of fuel injectors 104. The engine 102 may be a compression ignition internal combustion engine using a fuel such as diesel. However, other types of engines, for example spark ignited, may be used with the present invention as well.

A typical engine for this application would include one or more cylinders (not shown) for combustion, and would have a fuel injector 104 corresponding to each cylinder. For example, as shown in FIG. 1, the engine 102 has n number of fuel injectors 104, and thus would be expected to have n number of cylinders. However, the present invention may also apply to an engine having a differing number of fuel injectors than cylinders, for example multiple fuel injectors per cylinder and such.

The engine 102 may include means 106 for monitoring an engine speed change, more generally referred to as means 106 for monitoring engine speed. Preferably, the means 106 for monitoring engine speed includes an engine speed sensor 108, for example of a type well known in the art.

A controller 114, among other functions, may receive a signal from the engine speed sensor 108, and responsively determine engine speed. The controller 114, in accordance with the present invention, may also receive the signal from the engine speed sensor 108 and responsively determine a change in engine speed, referred to hereinafter as Δ speed.

The controller 114 may also include means 110 for modifying an engine speed control. The means 110 for modifying an engine speed control may include an engine speed control device 112, for example an engine speed governor. The engine speed control device 112 may be software based and located as part of the controller 114 as shown, or may be a separate software based control unit. Alternatively, the engine speed control device 112 may be non-software based, such as for example a mechanical speed governor.

Figure 4:
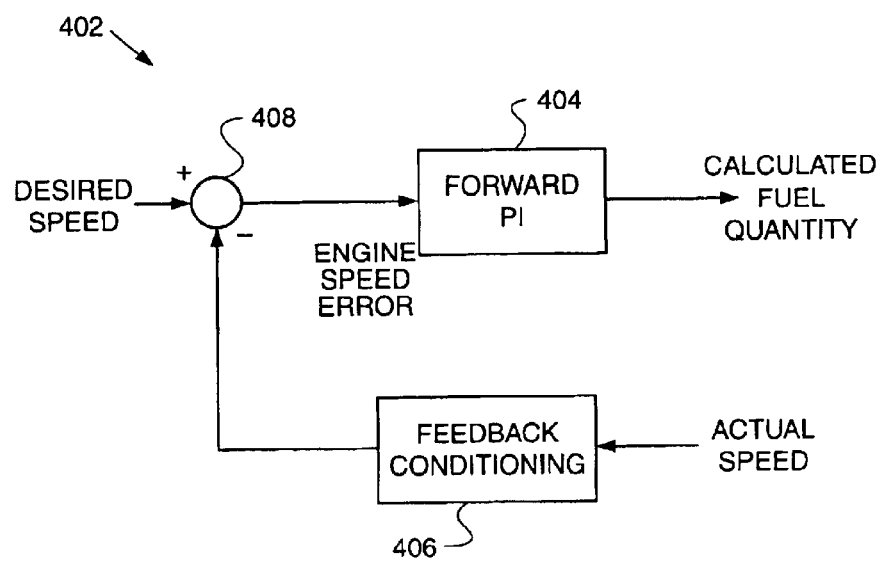
FIG. 4 is a control diagram of an exemplary controller suited for use in the present invention.

An engine speed control device 112 suited for use with the present invention may include a proportional-integral (PI) controller, as is well known in the art. For example, FIG. 4 illustrates an exemplary PI controller 402 which may be used with the present invention. It is noted, however, that various other types of controllers may be used, for example PID controllers and such.

The PI controller 402 of FIG. 4 includes a forward PI module 404 which may receive a signal indicative of a comparison of a desired engine speed and an actual engine speed, i.e., an engine speed error term, such as may be produced at summing junction 408. The PI controller 402 also includes a feedback conditioning module 406 which receives a signal representative of an actual engine speed, processes the signal, and delivers the processed signal to summing junction 408. The forward PI module 404 may process the engine speed error signal from summing junction 408 and calculate a desired fuel quantity, preferably to maintain the actual engine speed equivalent to the desired engine speed. It is noted that the forward PI module 404 may contain gain terms for each of the proportional and the integral portions of the module. These gain terms may be controlled, as described below. It is also noted that the PI controller 402 may include additional modules to perform additional signal processing, and one or the other of the forward PI and feedback conditioning modules 404, 406 may not be included.

Referring still to FIG. 1, the controller 114 may include means 116 for interrupting an injection event. An injection event may refer to an injection of a total amount of fuel by an injector 104, or may refer to an injection of a portion of a total amount of fuel, for example a pilot or a main injection. Thus, for example one injection event may be a pilot injection and another injection event may be a main injection.

Figure 2:
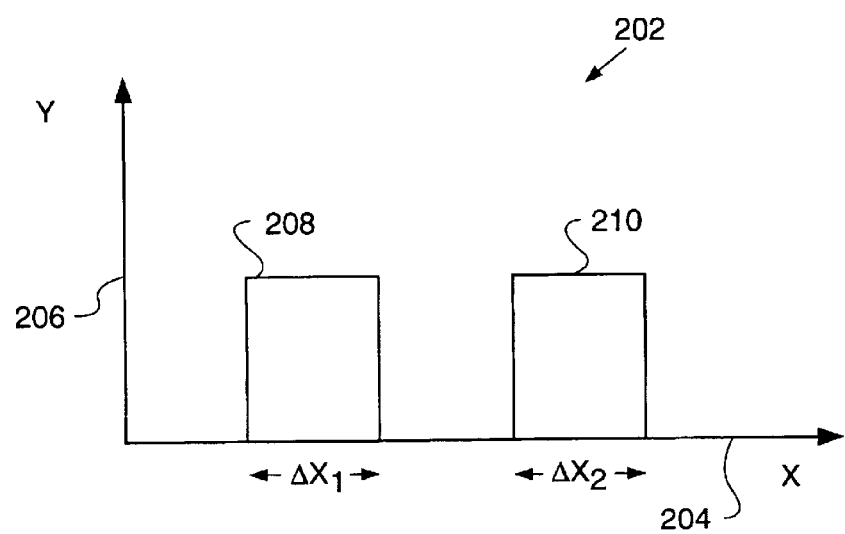
FIG. 2 is an illustrative plot of multiple injection events as may be used in the present invention.

Referring to FIG. 2, a plot 202 indicating a series of injection events is shown. Two injection events, a pilot injection event 208 and a main injection event 210 are indicated. The X-axis 204 of the plot 202 may be indicative of time, crank angle, or some other suitable variable. The Y-axis 206 may indicate magnitude of current, fuel, and the like. The plot 202 is shown displaying pilot and main injection events 208, 210 having the same duration; that is, the pilot injection event 208 has a duration of $\Delta x_1$, the main injection event 210 has a duration of $\Delta x_2$, and $\Delta x_2$ is equal to $\Delta x_2$. This embodiment is typically known as split injection. It is noted that the durations, $\Delta x_1$ and $\Delta x_2$, typically are of different values but are still classified as split injection since the fuel delivery quantities are equal. For example, the magnitudes, i.e., depicted by the Y-axis 206, may differ to compensate for differing durations. For purposes of illustration, however, the durations are shown equal.

Referring back to FIG. 1, the controller 114 may also include means 118 for trimming an injector. The means 118 for trimming an injector preferably refers to the controller 114 being able to adjust the duration of an injection event. More specifically, referring briefly again to FIG. 2, the controller 114 may be able to adjust a duration $\Delta x_1$, $\Delta x_2$ of at least one of the pilot and main injection events 208, 210.

INDUSTRIAL APPLICABILITY

Figure 3:
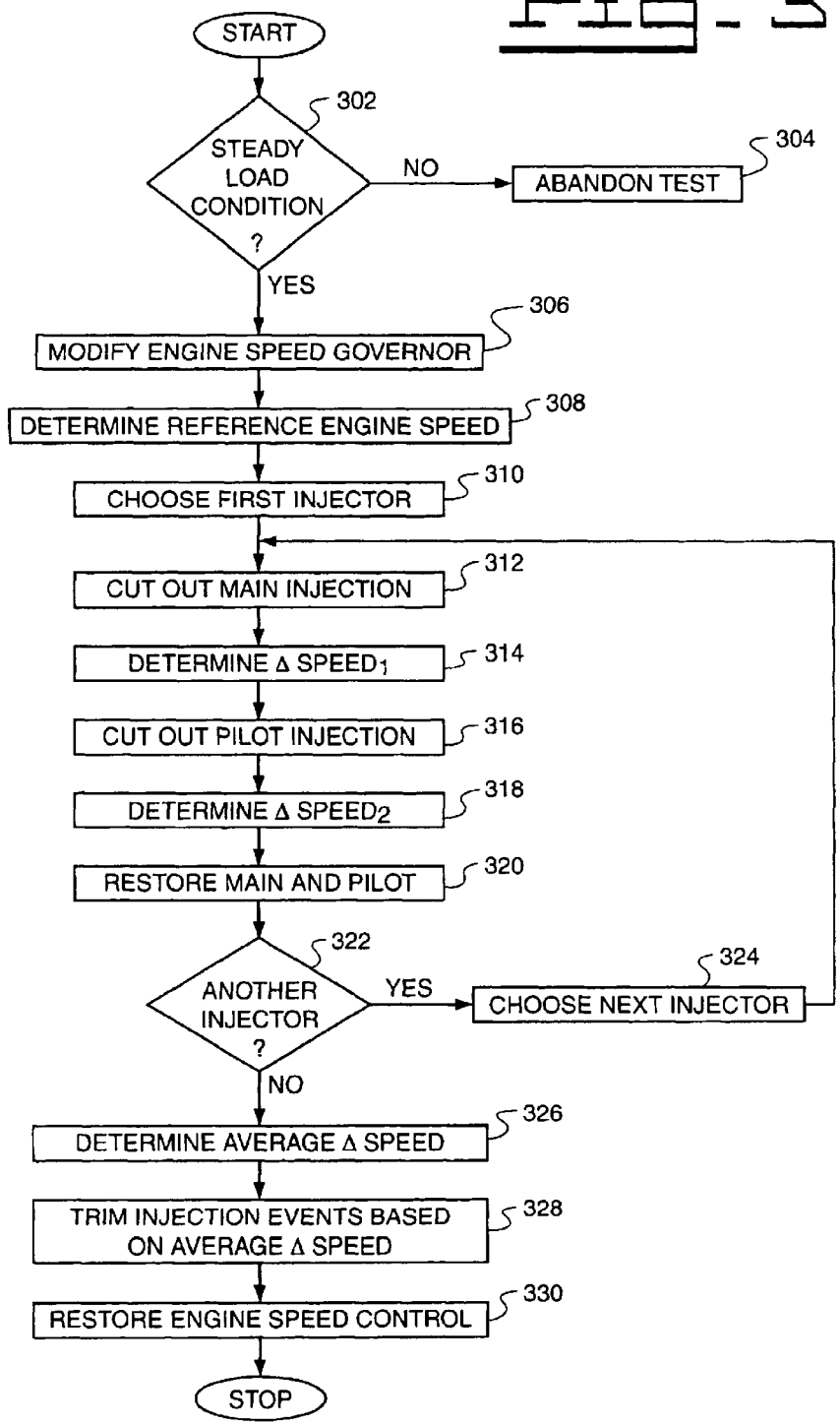
FIG. 3 is a flow diagram depicting a preferred method of the present invention.

Referring to FIG. 3, a flow diagram illustrating a preferred method of the present invention is shown. The preferred method depicted may be described with respect to an application of the present invention.

In a first decision block 302, it is determined if the engine 102 is operating in a steady load condition. The engine 102 may be operated in a test cell environment, under service conditions, or during normal operation in which the load applied to the engine 102 does not vary. If a steady load condition is not found, the test is abandoned as shown in a first control block 304. It is noted that, although first decision block 302 is shown at one location on the flow diagram, the steady load condition must be maintained throughout the test or the test must be abandoned at any time the load changes.

In a second control block 306, the engine speed governor is modified. For example, in the PI controller 402 of FIG. 4, the proportional gain of the forward PI module 404 may be altered, e.g., reduced, and the integral gain of the forward PI module 404 may be set to zero. This would have the effect of "loosening", i.e., modifying, the engine speed control device 112 so that some degree of changes in engine speed are allowed. In alternative configurations, the engine speed control device 112 may be temporarily uncoupled for test purposes.

The engine speed is then allowed to settle into a steady state condition and, in a third control block 308, a reference engine speed is determined.

In a fourth control block 310, a first injector 104 for testing is chosen. Typically, the tests will be conducted for all injectors 104 in the engine 102 before the test is terminated.

In a fifth control block 312, the main injection event 210 is cut out. Control then proceeds to a sixth control block 314, in which a change in speed from the reference speed, $\Delta$ speed$_1$, is determined. In an alternative embodiment, a change in time it takes to change from the reference speed to a predetermined other speed may be determined.

In a seventh control block 316, the main injection event 210 is maintained in a cut out state and the pilot injection event 208 is also cut out. Then, in an eighth control block 318, a further change in speed from the previous change in speed, $\Delta$ speed$_2$, is determined.

In a ninth control block 320, the main and pilot injection events 208, 210 for the injector 104 being tested are restored.

In a second decision block 322, it is determined if another injector 104 needs to be tested. If yes, control proceeds to a tenth control block 324, in which the next injector 104 is chosen and the control steps 312–320 are repeated. If no, control proceeds to an eleventh control block 326, in which an average $\Delta$ speed is determined from all the previously determined $\Delta$ speeds. In a split injection system, i.e., the pilot injection events are equal in fuel delivery to the main injection events, all $\Delta$ speeds are used to determine the average $\Delta$ speed. If the pilot injection events are not equal in fuel delivery to the main injection events, e.g., the pilot injection events are a smaller percentage of the total injection duration, then an average $\Delta$ speed may be determined for the pilot events and a different $\Delta$ speed may be determined for the main events.

In variations of the above steps, control blocks 312–320 may be modified in various ways, such as the main injection event 210 may be turned back on prior to turning off the pilot injection event 208, or the pilot injection event 208 may be turned off first, then the main injection event 210 may be turned off.

In a twelfth control block 328, one or more injection events are trimmed as a function of the average $\Delta$ speed. For example, the duration of at least one of the pilot and main injection events 208, 210 for each injector 104 may be adjusted, i.e., trimmed. Alternatively, one or more injection events may be modified by varying the timing of the event. The entire process may then be repeated with the new trims, thus making the overall trim process iterative; that is, the process may be repeated until either the injection events are determined to be adequate or until a set number of iterations are performed.

In a thirteenth control block 330, engine speed control is restored and normal operations may resume.

Other aspects can be obtained from a study of the drawings, the disclosure, and the appended claims.

What is claimed is:

1. A method for trimming a fuel injector located on an engine, comprising the steps of:

modifying an engine speed control;

interrupting at least one injection event;

monitoring a change of an engine speed; and trimming the injector in response to the change.

2. A method, as set forth in claim 1, wherein modifying an engine speed control includes the step of loosening an engine speed control to allow changes in engine speed within a desired range.

3. A method, as set forth in claim 2, wherein the engine speed control is a proportional-integral control and modifying an engine speed control includes the steps of:

modifying a gain of the proportional control; and selectively disabling the integral control.

4. A method, as set forth in claim 1, wherein interrupting at least one injection event includes the step of interrupting at least one of a pilot and a main injection event.

5. A method, as set forth in claim 4, wherein interrupting at least one injection event includes the step of cutting out at least one injection event.

6. A method, as set forth in claim 5, wherein interrupting at least one injection event includes the steps of:

cutting out a main injection event; and subsequently cutting out a pilot injection event while the main injection event is cut out.

7. A method, as set forth in claim 5, wherein interrupting at least one injection event includes the step of cutting out one of a main and a pilot injection event.

8. A method, as set forth in claim 1, wherein monitoring a change in engine speed includes the step of monitoring a time for a change from a first engine speed to a second engine speed.

9. A method, as set forth in claim 1, wherein monitoring a change associated with an engine speed includes the steps of:

determining a reference speed subsequent to modifying the engine speed control;

interrupting a first injection event;

determining a first change in engine speed from the reference speed in response to interrupting the first injection event;

interrupting a second injection event; and determining a second change in engine speed from the first change in engine speed in response to interrupting the second injection event.

10. A method, as set forth in claim 1, wherein interrupting at least one injection event includes the steps of:

determining a reference speed subsequent to modifying the engine speed control;

interrupting a main injection event;

determining a first change in engine speed from the reference speed in response to interrupting the main injection event;

interrupting a pilot injection event during interruption of the main injection event; and determining a second change in engine speed from the first change in engine speed in response to interrupting the pilot injection event.

11. A method, as set forth in claim 1, wherein the engine includes a plurality of fuel injectors located thereon, further including the steps of:

interrupting at least one injection event for a first injector;

monitoring a change associated with the engine speed;

restoring the at least one injection event to the first injector; and repeating the interrupting and speed monitoring steps for each of the plurality of injectors.

12. A method, as set forth in claim 11, further including the steps of:

determining an average engine speed change based on the interrupting and speed monitoring steps; and trimming each of the plurality of fuel injectors as a function of the average speed change.

13. A method for trimming a fuel injector located on an engine, comprising the steps of:

modifying an engine speed control;

interrupting a main injection event;

determining a first speed change;

interrupting a pilot injection event while maintaining the main injection event interruption;

determining a second speed change; and trimming the fuel injector as a function of the first and second speed changes.

14. A method, as set forth in claim 13, wherein trimming the fuel injector includes the step of modifying the duration of at least one fuel injection event.

15. A method of trimming a plurality of fuel injectors located on an engine, comprising the steps of:

a) modifying an engine speed control;

b) interrupting at least one injection event for a first injector;

c) monitoring a first engine speed change, which is associated with interrupting the at least one injection event for the first injector;

d) repeating steps b) and c) for each additional fuel injector;

e) determining an average engine speed change; and f) trimming each fuel injector in response to each fuel injector's associated engine speed chance.

16. A method, as set forth in claim 15, further including the step of restoring the engine speed control.

17. An apparatus for trimming a fuel injector located on an engine, comprising:

an engine speed control device;

an engine speed sensor; and a controller for modifying an engine speed control of the engine speed control device, interrupting at least one injection event, monitoring a change in engine speed, and trimming the injector in response to the change.

18. An apparatus for trimming a fuel injector located on an engine, comprising:

means for modifying an engine speed control;

means for interrupting at least one injection event;

means for monitoring a change of an engine speed; and means for trimming the injector in response to the change.

19. A method for balancing multiple injection events of a fuel injector located on an engine, comprising the steps of:

interrupting a first injection event;

monitoring a change associated with an engine speed;

interrupting a second injection event;

monitoring a further change associated with the engine speed; and trimming the first and second injection events as a function of the engine speed changes.

20. A method, as set forth in claim 19, further including the step of modifying an engine speed control during the interrupting and speed monitoring steps.

* * * * *

UNITED STATES PATENT AND TRADEMARK OFFICE
CERTIFICATE OF CORRECTION

PATENT NO. : 6,850,835 B1
DATED : February 1, 2005
INVENTOR(S) : Travis Barnes et al.

It is certified that error appears in the above-identified patent and that said Letters Patent is hereby corrected as shown below:

Column 6,
Line 32, delete "chance" and insert -- change --

Signed and Sealed this

Seventeenth Day of May, 2005

JON W. DUDAS
*Director of the United States Patent and Trademark Office*